US011151706B2

United States Patent
Savchenko et al.

(10) Patent No.: US 11,151,706 B2
(45) Date of Patent: Oct. 19, 2021

(54) METHOD OF CLASSIFYING DEFECTS IN A SEMICONDUCTOR SPECIMEN AND SYSTEM THEREOF

(71) Applicant: APPLIED MATERIAL ISRAEL, LTD., Rehovot (IL)

(72) Inventors: Kirill Savchenko, Lod (IL); Assaf Asbag, Alfei Menashe (IL); Boaz Cohen, Lehavim (IL)

(73) Assignee: APPLIED MATERIAL ISRAEL, LTD., Rehovot (IL)

( * ) Notice: Subject to any disclaimer, the term of this patent is extended or adjusted under 35 U.S.C. 154(b) by 363 days.

(21) Appl. No.: 16/249,852

(22) Filed: Jan. 16, 2019

(65) Prior Publication Data

US 2020/0226743 A1    Jul. 16, 2020

(51) Int. Cl.
*G06T 7/00* (2017.01)
*G01N 21/95* (2006.01)

(52) U.S. Cl.
CPC ....... *G06T 7/0004* (2013.01); *G01N 21/9501* (2013.01); *G06T 2207/30148* (2013.01)

(58) Field of Classification Search
CPC ............ G06T 7/00; G06T 7/0004; G06T 2207/30148; G06T 2200/24; G01N 21/9501; G01N 2021/8883; G01N 2021/8854; G06K 2209/19; G06K 9/6256; G06K 9/6222; G06K 9/6292
See application file for complete search history.

(56) References Cited

U.S. PATENT DOCUMENTS

| 9,984,199 | B2 * | 5/2018 | Sood ................... G16B 20/00 |
| 10,810,736 | B2 * | 10/2020 | Fuchs ................. G16H 50/20 |
| 2018/0114310 | A1 * | 4/2018 | He ..................... G06K 9/6292 |

(Continued)

FOREIGN PATENT DOCUMENTS

| CN | 109117956 A | * | 1/2019 | ............. G06N 99/00 |
| KR | 2018-0005218 A | * | 1/2018 | ............... G06T 7/00 |
| KR | 2019-0037123 A | * | 4/2019 | ............. H01L 21/67 |

OTHER PUBLICATIONS

Dennis D. Leber, Sample Allocation for Multiple Attribute Selection Problems, © 2014 IEEE, 11 pages (Year: 2014).*

(Continued)

*Primary Examiner* — Tung S Lau
(74) *Attorney, Agent, or Firm* — Lowenstein Sandler LLP (57) ABSTRACT

A system, method and computer readable medium for classifying defects, the method comprising: receiving classified first defects, and potential defects, each first and potential defect having values for attributes; processing the first and potential defects to select a subset of the attributes that differentiates the first defects from the potential defects; obtaining first and second functions based on the first defects and potential defects, respectively; obtaining a first threshold for the first function, and a second threshold for a combination of the first and second functions; applying the first function and the second function to each potential defect to obtain first and second scores, respectively; and determining a combined score of the first and second scores; and indicating as a defect of a potentially new type a potential defect when the first score is lower than the first threshold or the combined score exceeds the second threshold.

9 Claims, 3 Drawing Sheets

(56) References Cited

U.S. PATENT DOCUMENTS

2019/0096053 A1* 3/2019 Asbag ............... G06K 9/00127
2019/0293669 A1* 9/2019 Savchenko ...... G01N 35/00623

OTHER PUBLICATIONS

Xinghui Dong, Defect Detection and Classification by Training a Generic Convolutional Neural Network Encoder, IEEE Transactions On Signal Processing, vol. 68, 2020, 15 pages (Year: 2020).*
Fred S. Azar, Multiattribute Decision-Making: Use of Three Scoring Methods to Compare the Performance of Imaging Techniques for Breast Cancer Detection, Jan. 2000, 26 pages (Year: 2000).*
Behjat Siddiquie, Image Ranking and Retrieval based on Multi-Attribute Queries, printed Mar. 22, 2021, 8 pages (Year: 2021).*
Soubarna Banik, Multi-label Object Attribute Classification using a Convolutional Neural Network, Nov. 10, 2018, 10 pages (Year: 2018).*
Sridhar Mourya, Multi-Attributes Web Objects Classification based on Class-Attribute Relation Patterns Learning Approach, International Journal of Advanced Computer Science and Applications, vol. 9, No. 12, 2018, 8 pages (Year: 2018).*
Xian, Yongqin, et al. "Zero-shot learning—a comprehensive evaluation of the good, the bad and the ugly." IEEE transactions on pattern analysis and machine intelligence(2018).
Wang, Wei, et al. "A survey of zero-shot learning: Settings, methods, and applications." ACM Transactions on Intelligent Systems and Technology (TIST) 10.2 (2019): 13.
Palatucci, Mark, et al. "Zero-shot learning with semantic output codes." Advances in neural information processing systems. 2009.
Demirel, Berkan, Ramazan Gokberk Cinbis, and Nazli Ikizler-Cinbis. "Attributes2classname: A discriminative model for attribute-based unsupervised zero-shot learning." Proceedings of the IEEE International Conference on Computer Vision. 2017.
Norouzi, Mohammad, et al. "Zero-shot learning by convex combination of semantic embeddings." arXiv preprint arXiv:1312.5650 (2013).
Akata, Zeynep, et al. "Label-embedding for image classification." IEEE transactions on pattern analysis and machine intelligence 38.7 (2015): 1425-1438.
Socher, Richard, et al. "Zero-shot learning through cross-modal transfer." Advances in neural information processing systems. 2013.
Frome, Andrea, et al. "Devise: A deep visual-semantic embedding model." Advances in neural information processing systems. 2013.
Elhoseiny, Mohamed, Babak Saleh, and Ahmed Elgammal. "Write a classifier: Zero-shot learning using purely textual descriptions." Proceedings of the IEEE International Conference on Computer Vision. 2013.
Zhang, Ziming, and Venkatesh Saligrama. "Zero-shot learning via semantic similarity embedding" Proceedings of the IEEE international conference on computer vision. 2015.
Koch, Gregory, Richard Zemel, and Ruslan Salakhutdinov. "Siamese neural networks for one-shot image recognition." ICML deep learning workshop. vol. 2. 2015.
Bertinetto, Luca, et al. "Learning feed-forward one-shot learners." Advances in Neural Information Processing Systems. 2016.
Vinyals, Oriol, et al. "Matching networks for one shot learning." Advances in neural information processing systems. 2016.
Rahman, Shafin, Salman Khan, and Fatih Porikli. "A unified approach for conventional zero-shot, generalized zero-shot, and few-shot learning." IEEE Transactions on Image Processing 27.11 (2018): 5652-5667.
Goodfellow, Ian. "NIPS 2016 tutorial: Generative adversarial networks." arXiv preprint arXiv:1701.00160 (2016).
Zhai, Shuangfei, et al. "Generative adversarial networks as variational training of energy based models." arXiv preprint arXiv:1611.01799 (2016).
Zhai, Shuangfei, et al. "Deep structured energy based models for anomaly detection." arXiv preprint arXiv:1605.07717 (2016).
Shrivastava, Ashish, et al. "Learning from simulated and unsupervised images through adversarial training." Proceedings of the IEEE conference on computer vision and pattern recognition. 2017.
Hugueny, Samuel, David A. Cliftony, and Lionel Tarassenko. "Novelty detection with multivariate extreme value theory, part II: an analytical approach to unimodal estimation." 2009 IEEE International Workshop on Machine Learning for Signal Processing. IEEE, 2009.
Clifton, D. A., Hugueny, S., & Tarassenko, L. (2011). Novelty detection with multivariate extreme value statistics. Journal of signal processing systems, 65(3), 371-389.
Hugueny, Samuel, David A. Clifton, and Lionel Tarassenko. "Probabilistic patient monitoring with multivariate, multimodal extreme value theory." International Joint Conference on Biomedical Engineering Systems and Technologies. Springer, Berlin, Heidelberg, 2010.
Rudd, Ethan M., et al. "The extreme value machine." IEEE transactions on pattern analysis and machine intelligence 40.3 (2017): 762-768.
Yun, Yixiao, Irene Yu-Hua Gu, and Hamid Aghajan. "Riemannian manifold-based support vector machine for human activity classification in images." 2013 IEEE International Conference on Image Processing. IEEE, 2013.
Feragen, Aasa, Francois Lauze, and Soren Hauberg. "Geodesic exponential kernels: When curvature and linearity conflict." Proceedings of the IEEE Conference on Computer Vision and Pattern Recognition. 2015.
McQueen, James, Marina Meila, and Dominique Joncas. "Nearly isometric embedding by relaxation." Advances in Neural Information Processing Systems. 2016.
Jayasumana, Sadeep, et al. "Kernel methods on Riemannian manifolds with Gaussian RBF kernels." IEEE transactions on pattern analysis and machine intelligence 37.12 (2015): 2464-2477.
Aanjaneya, Mridul, et al. "Metric graph reconstruction from noisy data." International Journal of Computational Geometry & Applications 22.04 (2012): 305-325.
Adamaszek, Michat, Henry Adams, and Florian Frick. "Metric reconstruction via optimal transport." SIAM Journal on Applied Algebra and Geometry 2.4 (2018): 597-619.
Chakraborty, Rudrasis, Soren Hauberg, and Baba C. Vemuri. "Intrinsic Grassmann averages for online linear and robust subspace learning." Proceedings of the IEEE Conference on Computer Vision and Pattern Recognition. 2017.
Silvestri, Francesco, Gerhard Reinelt, and Christoph Schnörr. "A convex relaxation approach to the affine subspace clustering problem." German Conference on Pattern Recognition. Springer, Cham, 2015.
Micenková, Barbora, et al. "Explaining outliers by subspace separability." 2013 IEEE 13th international conference on data mining. IEEE, 2013.

\* cited by examiner

METHOD OF CLASSIFYING DEFECTS IN A SEMICONDUCTOR SPECIMEN AND SYSTEM THEREOF

TECHNICAL FIELD

The presently disclosed subject matter relates, in general, to the field of examination of a specimen, and more specifically, to methods and systems capable of automated detection of defects belonging to a new class.

BACKGROUND

Current demands for high density and performance associated with ultra large scale integration of fabricated devices, require submicron features, increased transistor and circuit speeds, and improved reliability. Such demands require formation of device features with high precision and uniformity, which, in turn, necessitate careful monitoring of the fabrication process, including frequent and detailed examination of the devices while they are still in the form of semiconductor specimens.

The term "specimen" used in this specification should be expansively construed to cover any kind of wafer, mask, and other structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on or within a specimen.

The complex manufacturing process of specimens is not error-free and such errors may cause faults in manufactured devices. The faults may include defects that can harm operation of the device, and nuisances, which may be defects, but do not cause any harm or malfunction of the manufactured device. By way of non-limiting example, defects may be caused during the manufacturing process, due to faults in the raw material, mechanical, electrical or optical errors, human errors, or others. Further, defects may be caused by spatio-temporal factors, such as temperature changes of the wafer occurring after one or more manufacturing stages during the examination process, which may cause some deformations of the wafer. The examination process can also introduce further alleged errors, for example due to optical, mechanical or electrical problems in the examination equipment or process, which thus provide imperfect captures. Such errors may produce false positive findings, which may seem to contain a defect, but no actual defect exists at the area.

In many applications, the type, or class, of a defect is of importance. For example, a defect may be classified into one of a number of classes, such as a particle, a scratch, a process, or the like.

Unless specifically stated otherwise, the term "examination" used in this specification should be expansively construed to cover any kind of detection and/or classification of defects in an object. Examination is provided by using non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification, is not limited with respect to the size of the inspected area(s), to the speed or resolution of the scanning, or to the type of examination tools. A variety of non-destructive examination tools includes, by way of non-limiting example, optical tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different specimen locations or for the same specimen locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least some of the defects detected during the inspection phase are, typically, captured at relatively low speed and/or high-resolution, thereby enabling classification and, optionally, other analyses of the at least some of the defects. In some cases both phases can be implemented by the same inspection tool, and, in some other cases, these two phases are implemented by different inspection tools.

GENERAL DESCRIPTION

In accordance with certain aspect of the presently disclosed subject matter, there is provided a system capable of classifying defects in a specimen into a plurality of classes, the system comprising a processing and memory circuitry (PMC) configured to: receive a first plurality of first defects classified to a plurality of classes, and a second plurality of potential second defects, each first defect and each potential second defect associated with a respective value for each attribute of a plurality of attributes, the first plurality characterized by a first attribute space, and the second plurality of defects characterized by a second attribute space; process the first plurality and second plurality to select a subset of attributes from the plurality of attributes, comprising: for each attribute: determine a first distribution of attribute values of defects from the first plurality; determine a second distribution of attribute values of defects from the second plurality; and determine a difference between the first distribution and the second distribution; select the subset of attributes as attributes having highest difference between the first distribution and the second distribution; obtain a first density estimation function based on values assigned to the subset of attributes for defects from the first plurality, and determining a second density estimation function based on values assigned to the subset of attributes for defects of second plurality; obtain a first threshold associated with the first density estimation function, and a second threshold associated with a combination of the first density estimation function and the second density estimation function; apply the first density estimation to each defect of the second plurality to obtain a first score; apply the second density estimation function to each defect of the second plurality to obtain a second score; determining a combined score of the first score and the second score; and indicate, as a defect of a potentially new type, a defect from the second plurality, when the first score is lower than the first threshold, or the combined score exceeds the second threshold. By way of non-limiting example, the potential defect is optionally indicated as an outlier when the first score is lower than the first threshold. By way of another non-limiting example, the potential defect is optionally indicated as an excursion when the second score exceeds the second threshold. By way of another non-limiting example, the combination of the first density estimation function and the second density estimation function is a ratio between a first score of a defect in the first density estimation function and a second score of the defect in the second density estimation function.

In accordance with another aspect of the presently disclosed subject matter, there is provided a method of classifying a plurality of defects using a processor operatively connected to a memory, the method comprising: receiving by the processor a first plurality of first defects classified to a plurality of classes, and a second plurality of potential second defects, each first defect and each potential second defect associated with a respective value for each attribute of a plurality of attributes, the first plurality characterized by a first attribute space, and the second plurality of defects characterized by a second attribute space; processing, by the processor, the first plurality and second plurality to select a subset of attributes from the plurality of attributes, comprising: for each attribute: determining by the processor a first distribution of attribute values of defects from the first plurality; determining by the processor a second distribution of attribute values of defects from the second plurality; and determining by the processor a difference between the first distribution and the second distribution; selecting by the processor the subset of attributes as attributes having highest difference between the first distribution and the second distribution; obtaining, by the processor, a first density estimation function based on values assigned to the subset of attributes for defects from the first plurality, and determining a second density estimation function based on values assigned to the subset of attributes for defects of second plurality; obtaining, by the processor, a first threshold associated with the first density estimation function, and a second threshold associated with a combination of the first density estimation function and the second density estimation function; applying, by the processor, the first density estimation to each defect of the second plurality to obtain a first score; applying, by the processor, the second density estimation function to each defect of the second plurality to obtain a second score; determining, by the processor, a combined score of the first score and the second score; and indicating as a defect of a potentially new type a defect from the second plurality when the first score is lower than the first threshold or the combined score exceeds the second threshold. By way of non-limiting example, the potential defect is optionally indicated as an outlier when the first score is lower than the first threshold. By way of another non-limiting example, the potential defect is optionally indicated as an excursion when the second score exceeds the second threshold. By way of another non-limiting example, the combination of the first density estimation function and the second density estimation function is a ratio between a first score of a defect in the first density estimation function and a second score of the defect in the second density estimation function.

In accordance with yet another aspect of the presently disclosed subject matter, there is provided a non-transitory computer readable medium comprising instructions that, when executed by a computer, cause the computer to perform a method of automated classifying defects in a specimen into a plurality of classes, the method comprising: receiving by a processor a first plurality of first defects classified to a plurality of classes, and a second plurality of potential second defects, each first defect and each potential second defect associated with a respective value for each attribute of a plurality of attributes, the first plurality characterized by a first attribute space, and the second plurality of defects characterized by a second attribute space; processing, by the processor, the first plurality and second plurality to select a subset of attributes from the plurality of attributes, comprising: for each attribute: determining, by the processor, a first distribution of attribute values of defects from the first plurality; determining, by the processor, a second distribution of attribute values of defects from the second plurality; and determining, by the processor, a difference between the first distribution and the second distribution; selecting, by the processor, the subset of attributes as attributes having highest difference between the first distribution and the second distribution; obtaining, by the processor, a first density estimation function based on values assigned to the subset of attributes for defects from the first plurality, and determining a second density estimation function based on values assigned to the subset of attributes for defects of second plurality; obtaining, by the processor, a first threshold associated with the first density estimation function, and a second threshold associated with a combination of the first density estimation function and the second density estimation function; applying, by the processor, the first density estimation to each defect of the second plurality to obtain a first score; applying, by the processor, the second density estimation function to each defect of the second plurality to obtain a second score; determining, by the processor, a combined score of the first score and the second score; and indicating as a defect of a potentially new type a defect from the second plurality when the first score is lower than the first threshold or the combined score exceeds the second threshold.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "calculating", "generating", "assigning", "selecting", "determining", "receiving", "training", "applying", "outputting" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the classifier and PMC therein disclosed in the present application.

The terms "non-transitory memory" and "non-transitory storage medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

The term "defect" in a specimen used in this specification, should be expansively construed to cover any kind of abnormality or undesirable feature formed on or within a specimen.

The term "known to belong to a class" used in this specification, should be expansively construed to cover any classification of a defect to a class which is considered ground truth, for example classification made by a human user, classification made by a trusted classifier, or the like.

When examining objects, each defect may be characterized by values assigned to a multiplicity of attributes, such as size, color, background color, or the like. Distance or vicinity between defects may be defined in accordance with an applicable distance function, for example a distance defined in the attribute space and the possible values for each attribute.

The term "classification" used in this specification should be expansively construed to cover any assignment of a defect to one of a plurality of predetermined classes such as a particle, a scratch, process, or the like, such that each defect is automatically classified into one of a number of classes, based on its attribute values, and items in the same class are generally in the vicinity of each other in the attribute space, in accordance with the defined distance function. The classes may be defined by a user or otherwise received.

Typically, a classifier is trained upon a collection of defects, referred to as a "training set", wherein each defect in the training set is classified to one of the defined classes, for example by a human user. Once training is done, the classifier can be used for classifying further defects, referred to as a "testing set" into the classes.

It is generally attempted to obtain a training set that represents as closely as possible the expected defects, i.e., the distribution of defects within the feature space among the classes is similar to the distribution in future testing set(s). However, this is not always possible, and some classes may be underrepresented or not represented at all in the training set, meaning that there are not enough defects of the classes for training. The result is that defects of these classes will not be classified correctly in runtime. Such misclassification can have a negative impact on a quality of process control, e.g. statistical process control (SPC).

Thus, given a training set and a testing set, it is required to detect defects of new classes in the testing set, which have not been observed, or have not been sufficiently observed in the training set.

Such defects may be of two types: outlier defects in which a new type manifests itself as a statistical outlier, and excursion defects in which a new type appears within the boundaries of known classes and manifests itself as a significant change in the defect distribution.

Some known techniques for detecting outlier defects include local outlier factor (LOF), One Class support vector machines (SVM), and Isolation forest. Known techniques for handling excursion detection typically rely on Kullback-Leibler (KL) divergence or similar metrics.

However, there is no known solution to detecting both aspects: new types of defects as well as excursion defects.

The under-representation of defects of certain populations, e.g., minority classes, when training a classifier, is thus a serious concern in the fabrication and examination process, for a number of reasons.

First, wrong classification may lead to inaccurate evaluation of the quality of the examination process. Due to the low representation of minority defects, the impact of minority defects on the process evaluation is low, therefore the quality of the whole process may be inaccurately evaluated.

Second, the stability of the examination process may be low: as smaller populations are more vulnerable to changes when defects are misclassified, a small number of defects, or even a single defect, may significantly affect the standard deviation of the process evaluation. It is thus hard to stably evaluate the examination process.

Third, mere classification errors cause defects which may be too severe to go unhandled. Moreover, significant efforts are put into eliminating some very severe defects, resulting in fewer remaining defects of these types. Thus, if such defects are underrepresented in the training process, further defects will not be classified to their classes, which may cause severe problems in the specimen to go unnoticed; and Fourth, certain types of defects, although referred to as belonging to the same class, may have different characteristics. For example, defects of type "particle" may be significantly different in metal and in silicone. By not identifying and training specific minority classes, important information related to particular defects may be lost.

The disclosed subject matter provides a method and apparatus for detecting defects of new classes. Utilizing the disclosure, a user may detect, in a testing set, defects which may be of new classes. The user can then examine the defects, and classify them as belonging to one or more new classes. Additionally or alternatively, if defects are detected with high probability as being of new classes, such defects can be clustered (in order to differentiate between a plurality of new classes) and automatically assigned to the new classes.

Once a sufficient number of such defects are detected for one or more new classes, typically a few dozens, for example at least 20-50 defects per class, the classifier can be trained with the defects, such that further defects may be classified correctly.

Figure 1:
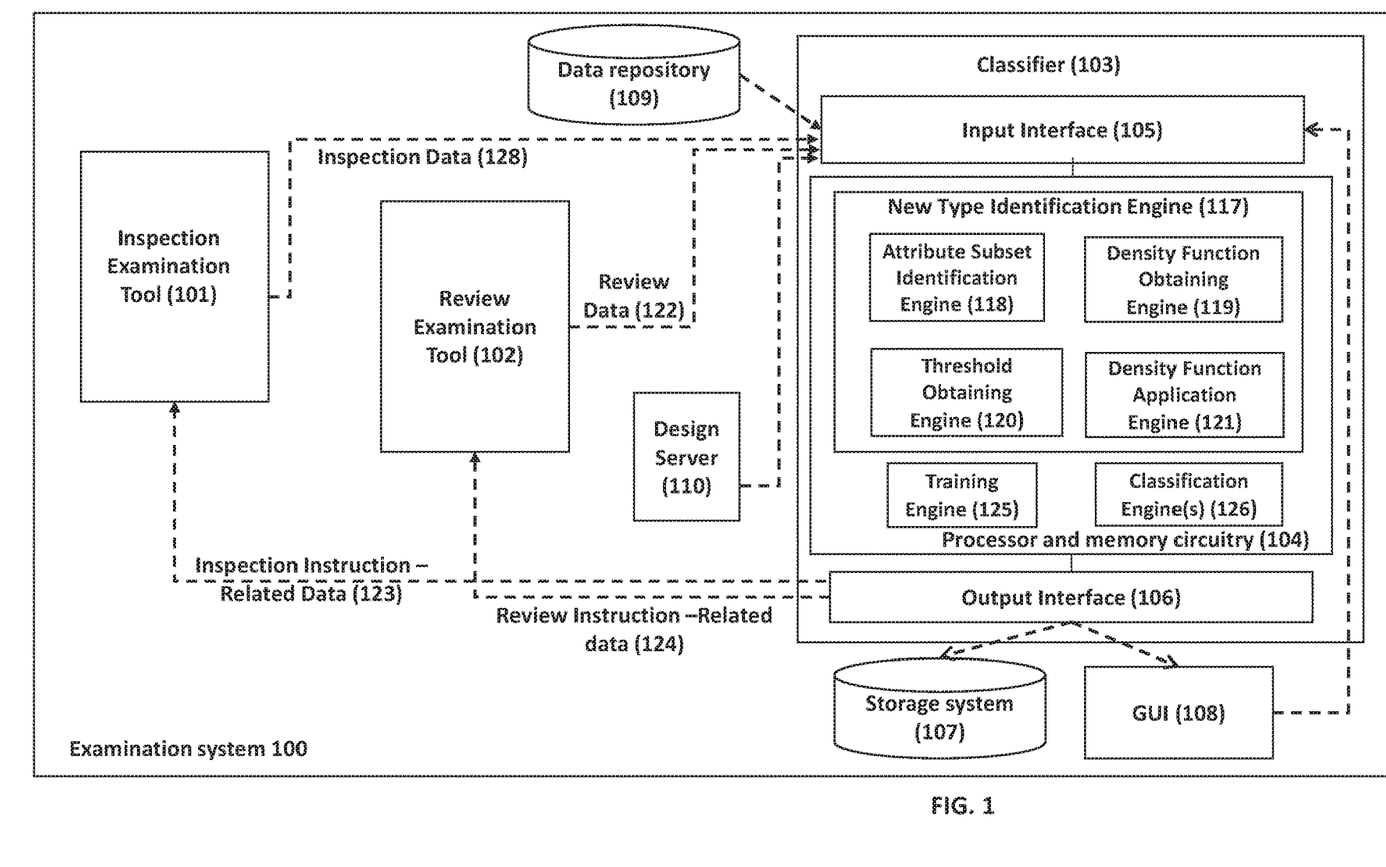
FIG. 1 illustrates a generalized block diagram of an examination system, in accordance with certain embodiments of the presently disclosed subject matter.

Bearing this in mind, attention is drawn to FIG. 1 illustrating a generalized block diagram of an examination system in accordance with certain embodiments of the presently disclosed subject matter. Examination system 100 illustrated in FIG. 1 can be used for examination of a specimen (e.g. of a wafer and/or parts thereof) as a part of specimen fabrication. Examination can be part of the object fabrication, and can be carried out during manufacturing the object, or afterwards. The examination system can comprise a variety of examination tools, for example, one or more inspection examination tools 101 configured to capture inspection images (typically, at relatively high speed and/or low resolution), and one or more review examination tools 102 configured to capture review images of at least some defects detected by inspection tools 101 (typically, at relatively low speed and/or high resolution). The illustrated examination system 100 further comprises a computer-based automated defect classifying tool (referred to hereinafter also as a classifier) 103 capable of automatically classifying defects into a plurality of classes in accordance with the defects type. By way of non-limiting example, classification may have different purposes, and the classification results can be used to identify specific defects of interest (DoI), filter false defects from true defects, establish Pareto in order to identify excursions in statistical process control (SPC), and/or otherwise in accordance with classification purposes.

A user can define the classes and the defects assigned to each class for training a classification engine 126 with the help of GUI 108. Further, GUI 108 may be configured to enable the user (and/or management system) to set purity, accuracy, extraction requirements or other parameters separately for each class, and to optimize the classification results in accordance with user requirements.

Classifier 103 can be operatively connected to one or more inspection tools 101 and/or one or more review tools 102. Optionally, classifier 103 can be fully or partly integrated with one or more inspection tools 101 or with one or more review tools 102. Classifier 103 can be further operatively connected to design server 110 and data repository 109.

A specimen can be examined by inspection tool 101 (e.g. an optical inspection system, low-resolution SEM, etc.). The resulting images and/or derivatives can be processed (optionally together with other data as, for example, design data and/or defect classification data) to select potential defects for review.

A subset of potential defect locations selected for review can be reviewed by review tool 102 (e.g. a scanning electron microscope (SEM) or Atomic Force Microscopy (AFM), etc.). The subset can be selected, for example and possibly as part of additional considerations, in accordance with the classes associated with the potential defects output by inspection tool 101, wherein the classes may be determined from inspection data 128 by classifier 103. For example, it may be required that at least a predetermined number or percentage of the defects in each class are reviewed.

Additionally or alternatively, Data (referred to hereinafter as review data 122) informative of review images and/or derivatives thereof and respective associated metadata can be transmitted—directly or via one or more intermediate systems—to classifier 103. It is noted that review data can include data generated by the one or more intermediate systems as derivatives of review images.

Classifier 103 comprises a processor and memory circuitry (PMC) 104 operatively connected to a hardware-based input interface 105 and/or to a hardware-based output interface 106. PMC 104 is configured to provide processing necessary for operating the classifier as further detailed with reference to FIG. 3, and comprises a processor and a memory (not shown separately within PMC). Operation of classifier 103 and PMC 104 will be further detailed with reference to FIGS. 2-3.

Processing results of Classifier 103 output by output interface 106, may be provided as inspection instruction related data 123 or review instruction related data 124 to inspection examination tools 101 or review examination tools 102, respectively, in order to change their operation, for example by changing values of operation parameters.

Those skilled in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of the examination tools 101 and/or 102, data repositories 109, storage system 107, design server 110 and/or GUI 108 can be external to the examination system 100 and operate in data communication with classifier 103 via input interface 105 and output interface 106. Classifier 103 can be implemented as a stand-alone computer(s) to be used in conjunction with one or more examination tools. Optionally, classifier 103 can operate on pre-acquired review data stored in data repositories 109 and/or storage system 107. Alternatively or additionally, the respective functions of classifier 103 can, at least partly, be integrated with one or more examination tools, process control tools, recipe generation tools, systems for automatic defects review and/or classification, and/or other systems related to examination.

PMC 104 can comprise new type identification engine 117, training engine 120 and one or more classification engines 121. New type identification engine 117 can be used for identifying defects of new types, such that training engine 120 can train one or more classification engines 121 to classify future defects also to the new defects.

New type identification engine 117 can comprise attribute subset identification engine 118. Attribute subset identification engine 118 can be configured to identify a subset of the attributes, such that defects of types unknown during training are differentiated from defects associated with other classes, by the values assigned to these attributes.

New type identification engine 117 can comprise density function obtaining engine 119, for determining a first density function for the training set and a second density function for the testing set. The density functions are determined according to the attribute subset identified by attribute subset identification engine 118.

New type identification engine 117 can comprise threshold obtaining engine 120 for associating a first threshold associated with the first density function, and a second threshold associated with a combination, for example a ratio, between the first density function and the second density function, such as a ratio. New type identification engine 117 can comprise density function application engine 126 for applying the first density function and the second density function to a defect to obtain a first score and a second score. If the first score exceeds the first threshold, the defect potentially is potentially an "outlier", i.e. has attribute values different from attribute values common in the training set. If the second score exceeds the second threshold, the defect is potentially an "excursion", i.e., may indicate a different distribution between the defect density in the training set and the testing set.

If the first score exceeds the first threshold, or the second score exceeds the second threshold, the defect may be output to a user, added to a collection of defects of potentially new types, or utilized in any other manner.

Figure 2:
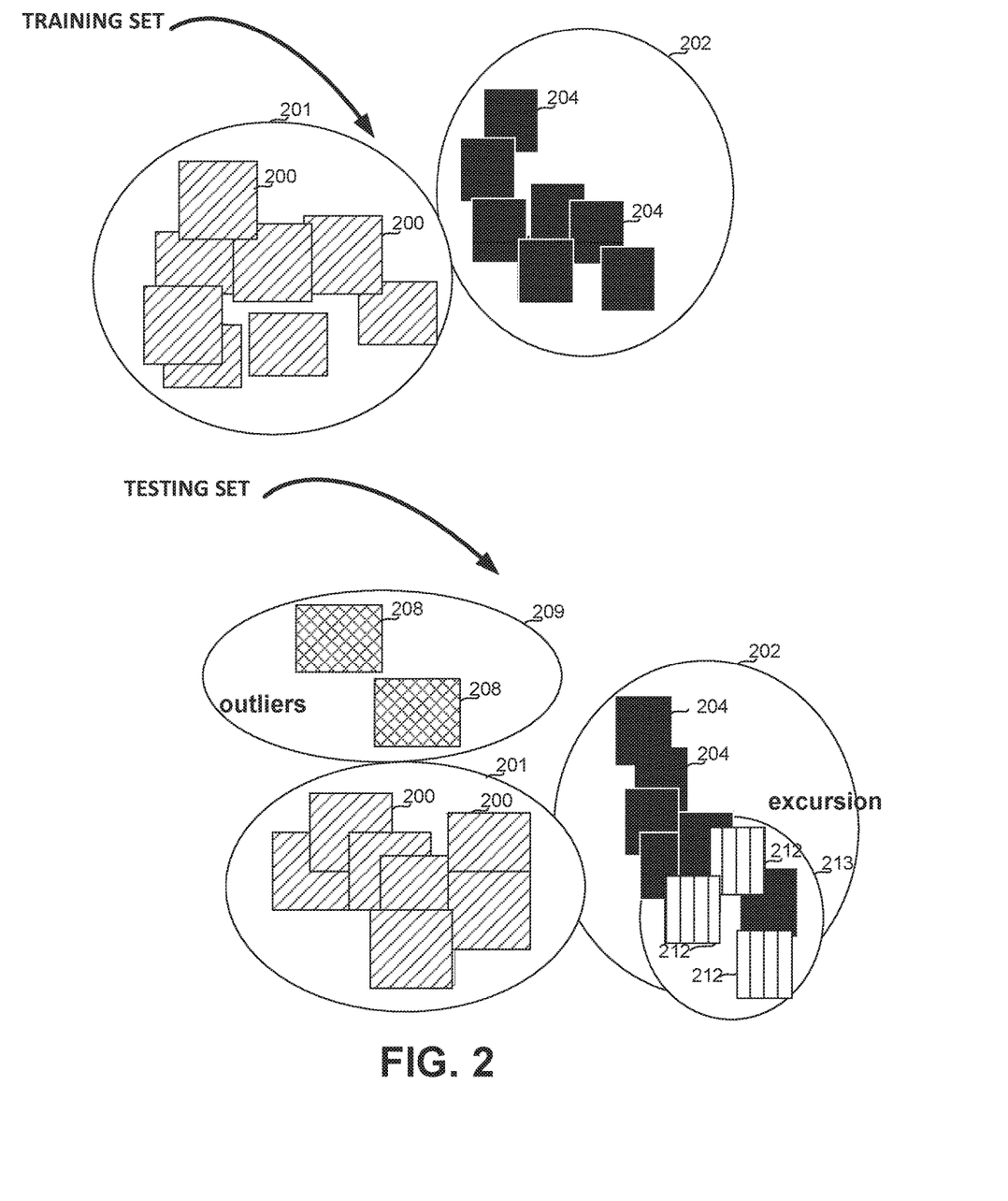
FIG. 2 illustrates exemplary two-dimensional cases of defects of new classes exhibited in a testing set.

Reference is now made to FIG. 2, providing a visualization of an example of defects of new classes exhibited in a testing set. For visualization purposes the example of FIG. 2 is two dimensional, i.e., represents defects having two attributes, although defects of typical systems comprise significantly more attributes, for example hundreds of attributes.

The training set comprises defects of two classes: defects 200 of a first class, contained in subspace 201 and defects 204 of a second class, contained in subspace 202.

The testing set, similarly to the training set, comprises defects 200 and defects 204. However, the testing set also comprises defects 208 comprised in subspace 209, which are outlier defects, since their subspace does not significantly overlap with the subspace of a known class, such as the classes of defects 200 or 204.

The testing set comprises also defects 212 contained in subspace 213, which does have significant overlap with subspace 202, and may therefore be initially classified as belonging to the same class. However, the presence of these defects in the testing set is identified by the change in the relative frequency of the defects assumed to be defects 204, i.e., defects 204 and defects 212 within substantially the same subspace as subspace 202.

Figure 3:
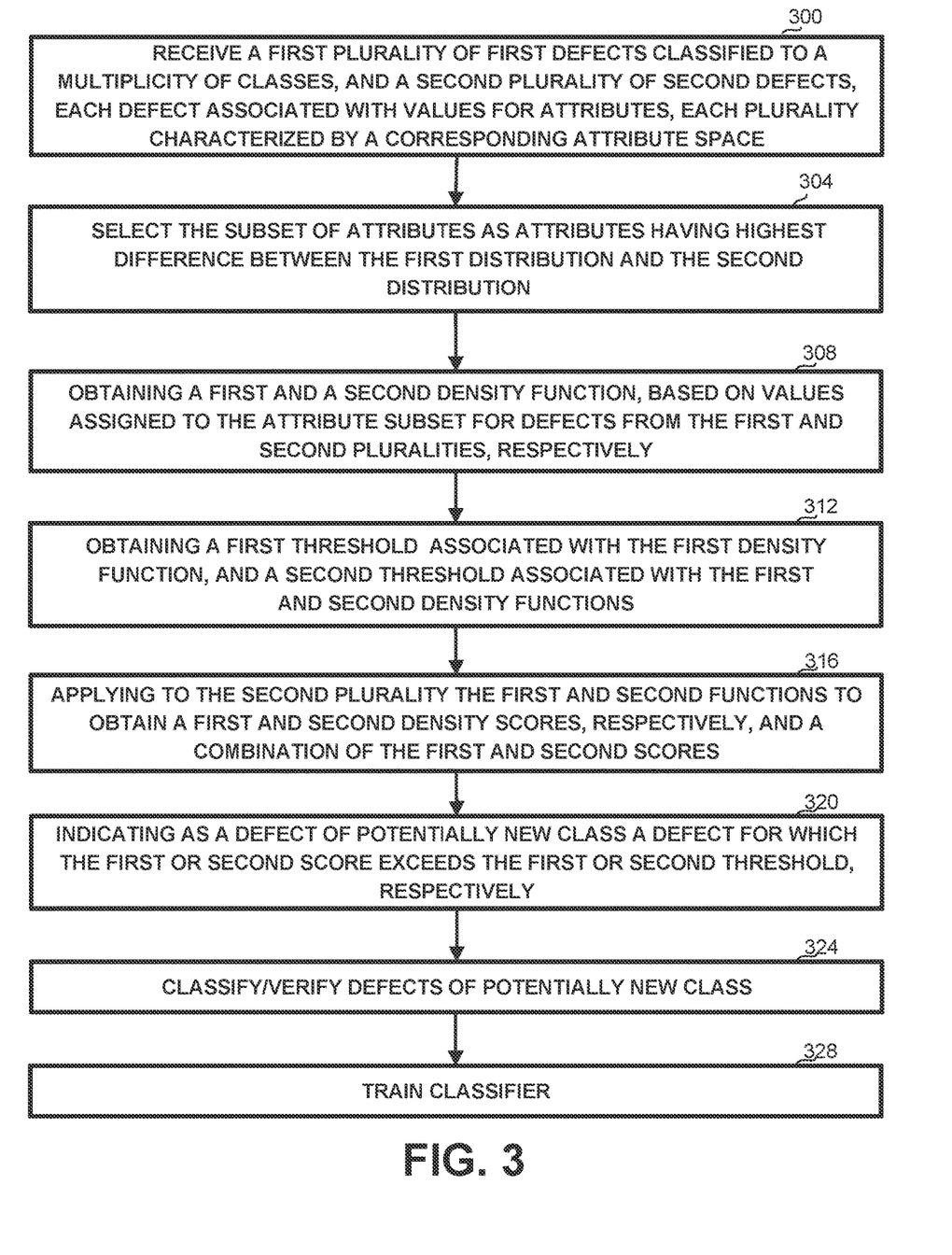
FIG. 3 illustrates a generalized flow-chart of a method of operating a new type identification engine, in accordance with certain embodiments of the presently disclosed subject matter.

Referring to FIG. 3, there is illustrated a generalized flow-chart of operating new type identification engine 117, in accordance with certain embodiments of the presently disclosed subject matter. PMC 104 is configured to execute the respective operations detailed below in accordance with computer-readable instructions implemented on a non-transitory computer-readable storage medium.

PMC 104 receives (300) a first plurality of first defects which are classified by a first classifier to a multiplicity of classes. The received defects have been pre-classified into predefined classes (e.g. by a human expert and/or another classifier and/or a previous classifier's version, etc.), such that this pre-classification is considered ground truth. PMC 104 also receives (300) a second plurality of second defects for which no ground truth is available. However, the second plurality may comprise defects of a type not present, or not sufficiently present, in the first plurality.

Each first defect and each second defect may be described as a collection, for example a vector, of values assigned to various attributes. Typically, each defect may be described as values assigned to hundreds or more attributes, related for example to its type, color, size, location, cause, or the like.

Attribute subset identification engine 117 can then identify (304) a subset of the attributes, which best distinguish between the first and the second pluralities. Thus, a plurality of attributes, possibly but not necessarily including all attributes, are examined as distinguishing attributes. An attribute is considered to better distinguish between the two pluralities if the overlap between the range of values of the first plurality and the range of values of the second plurality is smaller. Thus, a first distribution may be determined for the values of the attribute for points of the first plurality, and a second distribution may be determined for the values of the attribute for points of the second plurality. The larger the difference between the first and second distributions, the better the attribute. In some embodiments, the lower the sum over the points in the second plurality of the density scores, as given by the density function of the first plurality, the better the attribute, since it indicates that using this attribute, the points in the second plurality are less likely to occur in the first plurality. A predetermined number of attributes may then be selected, wherein the best attributes may be selected as described above.

Density function obtaining engine 119 can obtain (308) first and second density functions, of the first and second pluralities, respectively. Each such density function is configured to receive, as input, a defect, described as a collection of values for attributes of the attribute subset, and output a score indicating whether the defect can be contained in the respective plurality. For example, a first defect that has many neighbors, e.g., defects whose attribute values are close to the attribute values of the first defect, will have a higher score than a defect having fewer such neighbors. The density functions can be determined, retrieved from a storage device, received over a network, or the like.

Threshold obtaining engine 119 can obtain (312) first and second thresholds for the first and second density functions, respectively.

The first threshold relates to the first density function. A score lower than the first threshold being assigned to a defect, indicates that the defect is likely to not belong to the training set, and may thus be considered an outlier.

The second threshold relates to a difference between the first density function and the second density function. A score higher than the second threshold being assigned to a defect, indicates that the defect is more likely to belong to the testing set than to the training set, and may thus be considered an excursion.

Density function application engine (121) can be configured to apply (316) the density functions to a defect, for example a defect from the testing set, and obtain a first and second score, and a combination of the first and second score, for example a ratio between the first score and the second score.

If the defect has a first score lower than the first threshold, it may thus be suspected and indicated (320) to be an outlier. If the defect has a second score which is larger than the second threshold, it may thus be suspected and indicated (320) to be an excursion. Either case can be suspected as a new type and may thus be indicated to a user.

PMC 104 can collect, optionally over a period of time, defects potentially belonging to new classes. The collected defects can be output and verified (324) manually by a user to be of one or more new classes. Alternatively, the defects can be clustered in order to identify one or more potential new classes.

Once a sufficient number of defects of each such new type, for example at least 20-50 defects, are collected, training engine 125 can then be trained over a plurality of defects, including the defects identified as indeed belonging to new classes. The resulting classification engine can then classify defects also into the new classes.

Those skilled in the art will readily appreciate that the teachings of the presently disclosed subject matter are not bound by the method illustrated in FIG. 3. Other appropriate algorithms and combinations thereof can be implemented in order to obtain minority defects and train a classifier accordingly.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A system capable of classifying defects in a specimen into a plurality of classes, the system comprising a processing and memory circuitry (PMC) configured to:
   receive a first plurality of first defects classified to a plurality of classes, and a second plurality of potential second defects, each first defect and each potential second defect associated with a respective value for each attribute of a plurality of attributes, the first plurality characterized by a first attribute space, and the second plurality of defects characterized by a second attribute space;
   process the first plurality and second plurality to select a subset of attributes from the plurality of attributes, comprising:
   for each attribute:
      determine a first distribution of attribute values of defects from the first plurality;
      determine a second distribution of attribute values of defects from the second plurality; and
      determine a difference between the first distribution and the second distribution;
   select the subset of attributes as attributes having highest difference between the first distribution and the second distribution;
   obtain a first density estimation function based on values assigned to the subset of attributes for defects from the first plurality, and determining a second density estimation function based on values assigned to the subset of attributes for defects of the second plurality;
   obtain a first threshold associated with the first density estimation function, and a second threshold associated with a combination of the first density estimation function and the second density estimation function;
   apply the first density estimation to each defect of the second plurality to obtain a first score;
   apply the second density estimation function to each defect of the second plurality to obtain a second score;
   determining a combined score of the first score and the second score; and
   indicate as a defect of a potentially new type a defect from the second plurality when the first score is lower than the first threshold, or the combined score exceeds the second threshold.

2. The system of claim 1, wherein the potential defect is indicated as an outlier when the first score is lower than the first threshold.

3. The system of claim 1, wherein the potential defect is indicated as an excursion when the second score exceeds the second threshold.

4. The system of claim 1, wherein the combination of the first density estimation function and the second density estimation function is a ratio between a first score of a defect in the first density estimation function and a second score of the defect in the second density estimation function.

5. A method of classifying a plurality of defects using a processor operatively connected to a memory, the method comprising:
   receiving a first plurality of first defects classified to a plurality of classes, and a second plurality of potential second defects, each first defect and each potential second defect associated with a respective value for each attribute of a plurality of attributes, the first plurality characterized by a first attribute space, and the second plurality of defects characterized by a second attribute space;
   processing by the processor the first plurality and second plurality to select a subset of attributes from the plurality of attributes, comprising:
   for each attribute:
      determining by the processor a first distribution of attribute values of defects from the first plurality;
      determining by the processor a second distribution of attribute values of defects from the second plurality; and
      determining by the processor a difference between the first distribution and the second distribution;
   selecting by the processor the subset of attributes as attributes having highest difference between the first distribution and the second distribution;
   obtaining by the processor a first density estimation function based on values assigned to the subset of attributes for defects from the first plurality, and determining a second density estimation function based on values assigned to the subset of attributes for defects of second plurality;
   obtaining by the processor a first threshold associated with the first density estimation function, and a second threshold associated with a combination of the first density estimation function and the second density estimation function;
   applying by the processor the first density estimation to each defect of the second plurality to obtain a first score;
   applying by the processor the second density estimation function to each defect of the second plurality to obtain a second score;
   determining by the processor a combined score of the first score and the second score; and
   indicating as a defect of a potentially new type a defect from the second plurality when the first score is lower than the first threshold or the combined score exceeds the second threshold.

6. The method of claim 5, wherein the potential defect is indicated as an outlier when the first score is lower than the first threshold.

7. The method of claim 5, wherein the potential defect is indicated as an excursion when the second score exceeds the second threshold.

8. The method of claim 5, wherein the combination of the first density estimation function and the second density estimation function is a ratio between a first score of a defect in the first density estimation function and a second score of the defect in the second density estimation function.

9. A non-transitory computer readable medium comprising instructions that, when executed by a computer, cause the computer to perform a method of automated classifying defects in a specimen into a plurality of classes, the method comprising:

receiving by a processor a first plurality of first defects classified to a plurality of classes, and a second plurality of potential second defects, each first defect and each potential second defect associated with a respective value for each attribute of a plurality of attributes, the first plurality characterized by a first attribute space, and the second plurality of defects characterized by a second attribute space;

processing by the processor the first plurality and second plurality to select a subset of attributes from the plurality of attributes, comprising:

for each attribute:

determining by the processor a first distribution of attribute values of defects from the first plurality;

determining by the processor a second distribution of attribute values of defects from the second plurality; and         determining by the processor a difference between the first distribution and the second distribution;

selecting by the processor the subset of attributes as attributes having highest difference between the first distribution and the second distribution;

obtaining by the processor a first density estimation function based on values assigned to the subset of attributes for defects from the first plurality, and determining a second density estimation function based on values assigned to the subset of attributes for defects of the second plurality;

obtaining by the processor a first threshold associated with the first density estimation function, and a second threshold associated with a combination of the first density estimation function and the second density estimation function;

applying by the processor the first density estimation to each defect of the second plurality to obtain a first score;

applying by the processor the second density estimation function to each defect of the second plurality to obtain a second score;

determining by the processor a combined score of the first score and the second score; and     indicating as a defect of a potentially new type a defect from the second plurality when the first score is lower than the first threshold or the combined score exceeds the second threshold.

\* \* \* \* \*

UNITED STATES PATENT AND TRADEMARK OFFICE
CERTIFICATE OF CORRECTION

PATENT NO.         : 11,151,706 B2                                    Page 1 of 1
APPLICATION NO.    : 16/249852
DATED              : October 19, 2021
INVENTOR(S)        : Kirill Savchenko, Assaf Asbag and Boaz Cohen It is certified that error appears in the above-identified patent and that said Letters Patent is hereby corrected as shown below:

In the Claims

In Claim 1, Column 11, Line 30, add --of first defects-- before "characterized"
In Claim 1, Column 11, Line 31, add --potential second-- before "defects"
In Claim 1, Column 11, Line 33, add --the-- before "second"
In Claim 1, Column 11, Line 48, delete "determining" and insert --determine--
In Claim 1, Column 11, Line 59, delete "determining" and insert --determine--
In Claim 5, Column 12, Line 17, add --of first defects-- before "characterized"
In Claim 5, Column 12, Line 18, add --potential second-- before "defects"
In Claim 5, Column 12, Line 20, add --the-- before "second"
In Claim 9, Column 13, Line 11, add --of first defects-- before "characterized"
In Claim 9, Column 13, Line 12, add --potential second-- before "defects"
In Claim 9, Column 13, Line 14, add --the-- before "second"

Signed and Sealed this
Nineteenth Day of July, 2022

Katherine Kelly Vidal
*Director of the United States Patent and Trademark Office*